United States Patent
Han et al.

(10) Patent No.: US 10,691,210 B2
(45) Date of Patent: Jun. 23, 2020

(54) TOUCH PANEL, ELECTRONIC DEVICE AND DRIVING METHOD THEREOF

(71) Applicant: BOE TECHNOLOGY GROUP CO., LTD., Beijing (CN)

(72) Inventors: Yanling Han, Beijing (CN); Haisheng Wang, Beijing (CN); Xiaoliang Ding, Beijing (CN); Xue Dong, Beijing (CN); Jing Lv, Beijing (CN); Chih Jen Cheng, Beijing (CN); Wei Liu, Beijing (CN); Pengpeng Wang, Beijing (CN); Xueyou Cao, Beijing (CN); Ping Zhang, Beijing (CN); Yanan Jia, Beijing (CN); Chun Wei Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1 day.

(21) Appl. No.: 16/072,011

(22) PCT Filed: Dec. 12, 2017

(86) PCT No.: PCT/CN2017/115656
§ 371 (c)(1),
(2) Date: Jul. 23, 2018

(87) PCT Pub. No.: WO2018/205597
PCT Pub. Date: Nov. 15, 2018

(65) Prior Publication Data
US 2019/0346924 A1    Nov. 14, 2019

(30) Foreign Application Priority Data
May 11, 2017  (CN) .......................... 2017 1 0329405

(51) Int. Cl.
*G06F 3/01* (2006.01)
*G06F 3/044* (2006.01)
(Continued)

(52) U.S. Cl.
CPC ............ *G06F 3/016* (2013.01); *G06F 3/0445* (2019.05); *G06F 3/0446* (2019.05); *G06F 3/042* (2013.01); *G06F 3/043* (2013.01); *G06F 3/045* (2013.01)

(58) Field of Classification Search
CPC combination set(s) only.
See application file for complete search history.

(56) References Cited

U.S. PATENT DOCUMENTS 6,271,833 B1 *  8/2001  Rosenberg ............ A63F 13/285
                                                                345/161
9,939,900 B2     4/2018  Cruz-Hernandez et al.
(Continued)

FOREIGN PATENT DOCUMENTS

CN    103034331 A    4/2013
CN    103713770 A    4/2014
(Continued)

OTHER PUBLICATIONS

International Search Report and Written Opinion dated Mar. 16, 2018.
First Chinese Office Action dated Dec. 3, 2019.

*Primary Examiner* — Robin J Mishler
(74) *Attorney, Agent, or Firm* — Dilworth & Barrese, LLP.; Michael J. Musella, Esq.

(57) ABSTRACT

A touch panel, an electronic device, and a driving method thereof are provided. The touch panel includes: a substrate and a tactile feedback layer, a touch detection circuit and a plurality of driving electrodes located on the substrate. The tactile feedback layer is configured to adjust hardness thereof under control of the driving electrode, the touch (Continued)

detection circuit is configured to provide a plurality of touch detection points, each of the touch detection points corresponding to at least one of the driving electrodes.

11 Claims, 4 Drawing Sheets

(51) Int. Cl.
    *G06F 3/042*      (2006.01)
    *G06F 3/043*      (2006.01)
    *G06F 3/045*      (2006.01)

(56) References Cited

U.S. PATENT DOCUMENTS

| | | | |
|---|---|---|---|
| 2010/0097323 A1 | 4/2010 | Edwards et al. | |
| 2012/0133494 A1* | 5/2012 | Cruz-Hernandez | G06F 3/016 340/407.2 |
| 2013/0307789 A1* | 11/2013 | Karamath | G06F 3/016 345/173 |
| 2016/0187977 A1 | 6/2016 | Cruz-Hernandez et al. | |
| 2017/0060243 A1 | 3/2017 | Khoshkava | |
| 2018/0299958 A1* | 10/2018 | Wang | H01L 41/1132 |
| 2019/0180674 A1 | 6/2019 | Han et al. | |

FOREIGN PATENT DOCUMENTS

| | | |
|---|---|---|
| CN | 104035561 A | 9/2014 |
| CN | 104035561 A | 9/2014 |
| CN | 105144052 A | 12/2015 |
| CN | 105204687 A | 12/2015 |
| CN | 205247346 U | 5/2016 |
| CN | 205318349 U | 6/2016 |
| CN | 105739612 A | 7/2016 |
| CN | 105912180 A | 8/2016 |
| CN | 106484095 A | 3/2017 |
| CN | 106652877 A | 5/2017 |

* cited by examiner

TOUCH PANEL, ELECTRONIC DEVICE AND DRIVING METHOD THEREOF

The present application claims priority of Chinese Patent Application No. 201710329405.3 filed on May 11, 2017, the disclosure of which is incorporated herein by reference in its entirety as part of the present application.

TECHNICAL FIELD

Embodiments of the present disclosure relate to a touch panel, an electronic device, and a driving method thereof.

BACKGROUND

As a brand-new human-machine interaction device, a touch screen has been widely used in various electronic devices such as a smart phone, a tablet personal computer, and a television, due to its characteristics of directness, high efficiency, accuracy, fluency, fashion, and the like. With rapid development of a touch screen technology, a tactile feedback technology gradually develops. The tactile feedback technology simulates a real tactile feeling of a human being through a combination of software and hardware, so that a user has a tactile experience of feeling like touching a real object when he/she touches a virtual object, which improves a human-machine interaction experience, and increases human-machine interactivity.

SUMMARY

At least one of embodiments of the present disclosure provides a touch panel, comprising: a substrate and a tactile feedback layer, a touch detection circuit and a plurality of driving electrodes located on the substrate, wherein, the tactile feedback layer is configured to adjust hardness thereof under control of the driving electrode, the touch detection circuit is configured to provide a plurality of touch detection points, each of the touch detection points corresponding to at least one of the driving electrodes.

For example, in the touch panel provided by the at least one of the embodiments of the present disclosure, hardness of the tactile feedback layer changes with a temperature of the driving electrode, and the higher the temperature of the driving electrode, the higher the hardness of the tactile feedback layer.

For example, For example, in the touch panel provided by the at least one of the embodiments of the present disclosure, the tactile feedback layer is made of a polymer hydrogel material.

For example, in the touch panel provided by the at least one of the embodiments of the present disclosure, the touch detection circuit includes any one of a capacitive touch detection circuit, a photoelectric touch detection circuit, a resistive touch detection circuit, an infrared touch detection circuit and a surface acoustic wave touch detection circuit.

For example, in the touch panel provided by the at least one of the embodiments of the present disclosure, the touch detection circuit includes a first electrode layer and a second electrode layer sequentially stacked on the substrate and insulated from each other, the first electrode layer includes a plurality of first electrode strips provided at intervals, the second electrode layer includes a plurality of second electrode strips provided at intervals, the plurality of first electrode strips and the plurality of second electrode strips intersect with each other to obtain a plurality of intersection points, and the plurality of intersection points are the touch detection points.

For example, in the touch panel provided by the at least one of the embodiments of the present disclosure, the driving electrode is provided at a gap between adjacent two of the second electrode strips in the second electrode layer.

For example, in the touch panel provided by the at least one of the embodiments of the present disclosure, the second electrode layer is covered with an insulating layer, the driving electrodes are arranged on the insulating layer in an array, and an orthogonal projection of the driving electrode on the substrate is located between orthogonal projections of adjacent two of the touch detection points on the substrate.

For example, in the touch panel provided by the at least one of the embodiments of the present disclosure, the tactile feedback layer covers the driving electrodes.

For example, the touch panel provided by the at least one of the embodiments of the present disclosure further includes: a plurality of first driving lines and a plurality of second driving lines insulated from each other the plurality of first driving lines extend along an extension direction of the first electrode strip, the plurality of second driving lines extend along an extension direction of the second electrode strip, and each of the driving electrodes is connected with one of the first driving lines and one of the second driving lines.

For example, in the touch panel provided by the at least one of the embodiments of the present disclosure, a square resistance of the driving electrode is larger than that of the first electrode strip and the second electrode strip, and each of the driving electrodes is connected with one of the first electrode strips and one of the second electrode strips.

At least one of embodiments of the present disclosure provides an electronic device, including: any of the above described touch panels, and a controller. The touch panel is configured to receive touch information and feed back tactile information, the controller is configured to send a control signal to the touch panel according to the touch information, to control the touch panel enabling a tactile feedback function.

For example, the electronic device provided by the at least one of the embodiments of the present disclosure further includes a memory. The controller is further configured to set a tactile feedback level of a predetermined position of the touch panel; the memory is configured to store the tactile feedback level.

For example, the electronic device provided by the at least one of the embodiments of the present disclosure further includes a temperature detection sensor, configured to detect a temperature of the driving electrode. When the temperature of the driving electrode is higher than a preset upper temperature limit of the tactile feedback level, the controller is further configured to turn off the driving signal of the driving electrode; when the temperature of the driving electrode is lower than a preset lower temperature limit of the tactile feedback level, the controller is further configured to turn on the driving signal of the driving electrode.

For example, the electronic device provided by the at least one of the embodiments of the present disclosure further includes a display panel, configured to overlap with the touch panel and display an image; or the touch panel is further configured to display an image; the touch panel is configured to adjust hardness thereof at a corresponding position according to an object in the displayed image.

At least one of embodiments of the present disclosure provides a driving method used in any of the above described electronic device, including: setting a tactile feedback level of a predetermined position of a touch panel; receiving touch information of a touch operation; sending a control signal, according to the touch information; and enabling a tactile feedback function of the touch panel, according to the control signal.

For example, in the driving method provided by the at least one of the embodiments of the present disclosure, the setting a tactile feedback level of a predetermined position of a touch panel, includes: acquiring hardness of an object in an image used in conjunction with the touch panel, matching the tactile feedback level according to the hardness of the object in the image; setting the tactile feedback level at the corresponding position of the object in the image.

For example, the driving method provided by the at least one of the embodiments of the present disclosure further includes re-analyzing the hardness of the object in the image, after the image is updated; updating the tactile feedback level at the corresponding position of the object in the image.

For example, the driving method provided by the at least one of the embodiments of the present disclosure further includes turning off the driving signal of the driving electrode when a temperature of the driving electrode is higher than a preset upper temperature limit of the tactile feedback level; turning on the driving signal of the driving electrode when the temperature of the driving electrode is lower than a preset lower temperature limit of the tactile feedback level.

For example, the driving method provided by the at least one of the embodiments of the present disclosure further includes disenabling the tactile feedback function, when the touch operation ends.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

FIG. 1b is a cross-sectional structural schematic diagram of the touch panel along a direction of A-A' in FIG. 1a;

FIG. 2b is a cross-sectional structural schematic diagram of the touch panel along a direction of B-B' in FIG. 2a;

DETAILED DESCRIPTION

Figure 1A:
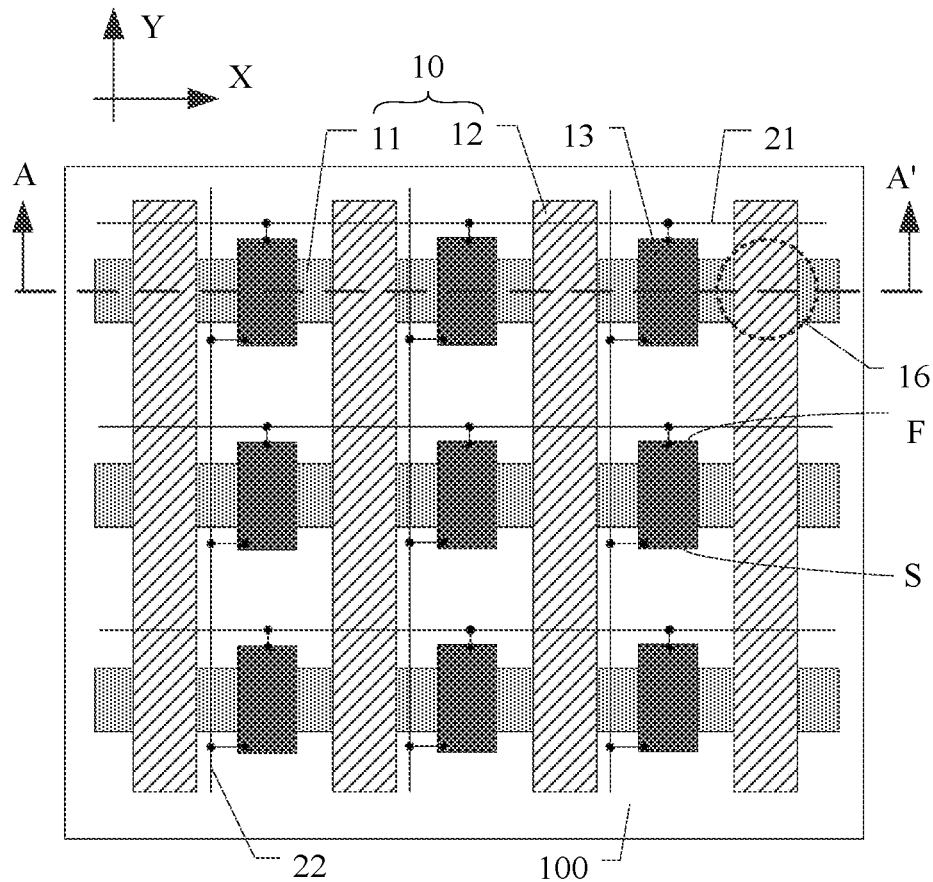
FIG. 1a is a plan view of a touch panel provided by an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meaning as understood by those ordinarily skilled in the art. In the present disclosure, words such as "first", "second" and the like do not denote any order, quantity, or importance, but rather are used for distinguishing different components. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but can include electrical connection, either direct or indirect. Words such as "up", "down", "left", "right" and the like are only used for expressing relative positional relationship, when the absolute position is described object is changed, the relative positional relationship can also be correspondingly changed.

Respective components or structures in the drawings are not strictly drawn to scale, and for the sake of clarity, sizes of the respective components or structures can be enlarged or reduced, for example, a thickness of a layer, a width of an interface, etc., can be increased, but these should not be used for limiting the scope of the present disclosure. In order to keep the following description of the embodiments of the present disclosure clear and concise, detailed descriptions of known functions and known components are omitted in the present disclosure.

A tactile feedback technology is a technology that enables a user to reproduce a real touch feeling when he/she touches a virtual object, and it may provide a more realistic tactile experience for the user through tactile sensation such as acting force, temperature, hardness, and vibration, so as to improve a human-machine interaction experience.

From a perspective of information input, tactile feedback can be divided into two categories: stimulation on epidermis and stimulation on receptors in muscle. The tactile feedback technology can be applied to various scenarios, for example, a recoil force of a certain weapon in a shooting game or an impact force of an explosion, a vibratory sense of playing a musical instrument in a musical instrument application, or wind whistling in an ear in a roller coaster game. For example, if a tactile feedback system is provided in an electronic apparatus, and the tactile feedback system includes vibration feedback, then, when the user plays the guitar with the electronic apparatus, the tactile feedback system in the electronic apparatus may feed a real vibration sensation back to the user when he/she is playing the guitar, and the vibration sensation will also change according to a high pitch and a low pitch, so as to create a realistic playing experience for the user.

At least one embodiment of the present disclosure provides a touch panel, which comprises: a substrate and a tactile feedback layer, a touch detection circuit and a plurality of driving electrodes located on the substrate. The tactile feedback layer is configured to adjust its hardness under control of the driving electrode, and the touch detection circuit is configured to provide a plurality of touch detection points, each touch detection point corresponding to at least one driving electrode. The touch panel simulates a tactile sensation of a real object with the tactile feedback layer, controls hardness of the tactile feedback layer through the driving electrode, implements tactile feedback with a fingerprint identification accuracy (for example, micron accuracy), improves a tactile feedback experience, and reduces power consumption.

Several embodiments of the present disclosure will be described in detail below; however, the present disclosure is not limited to these specific embodiments.

Figure 1B:
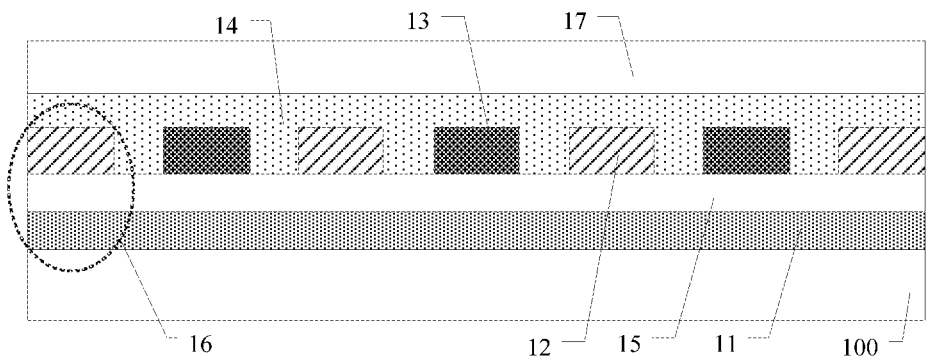
Figure 1C:
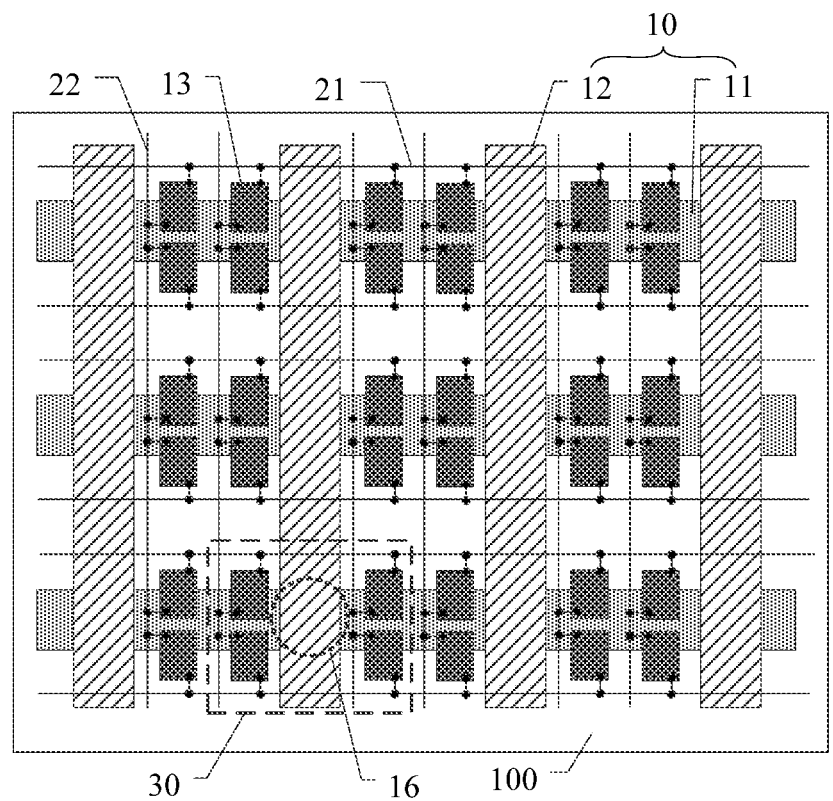
FIG. 1c is a plan view of another touch panel provided by an embodiment of the present disclosure.
Figure 1D:
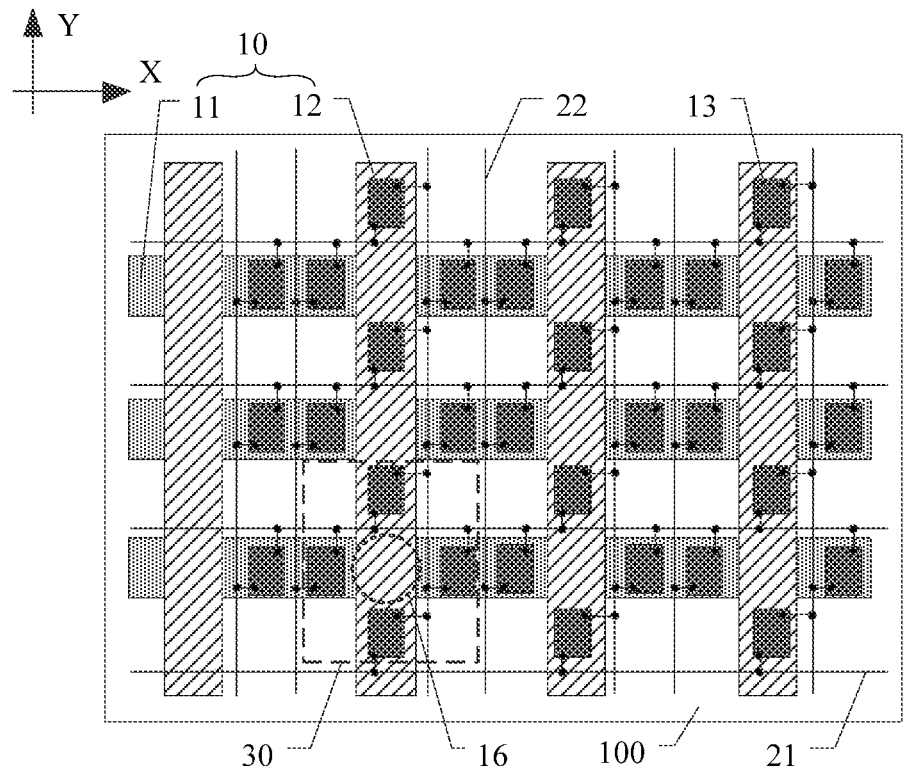
FIG. 1d is a plan view of a further touch panel provided by an embodiment of the present disclosure.
Figure 2A:
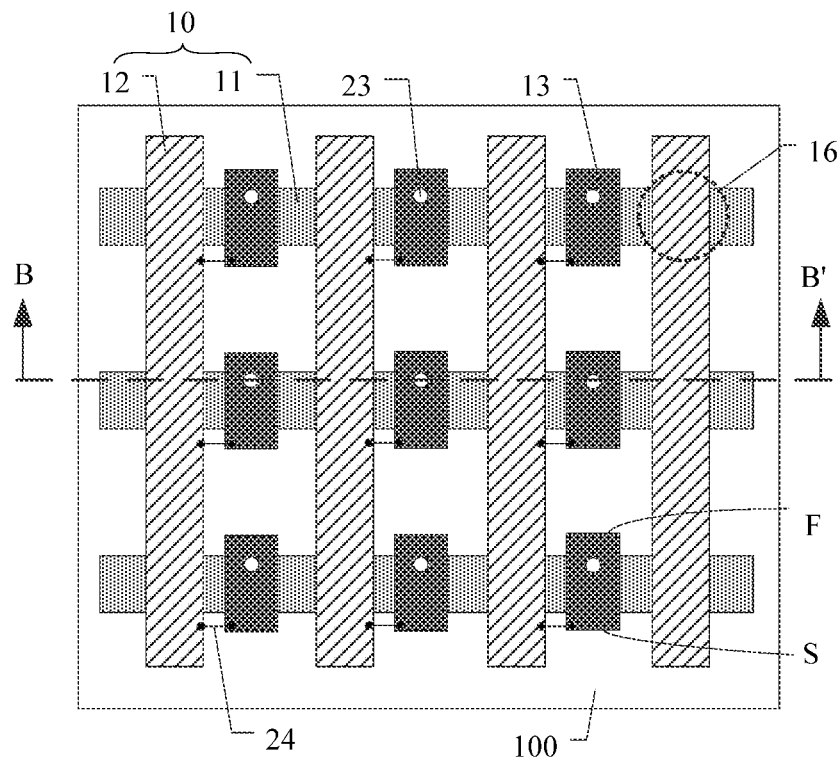
FIG. 2a is a plan view of still another touch panel provided by an embodiment of the present disclosure.
Figure 2B:
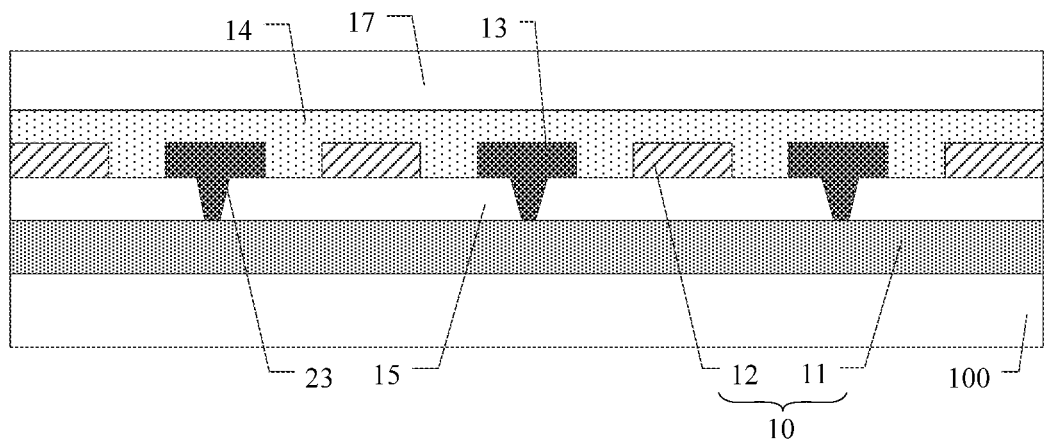

An embodiment of the present disclosure provides a touch panel, FIG. 1a shows a plan view of a touch panel provided by an embodiment of the present disclosure; FIG. 1b shows a cross-sectional structural schematic diagram of the touch panel along a direction of A-A' in FIG. 1a; FIG. 1c shows a plan view of another touch panel provided by an embodiment of the present disclosure; FIG. 1d shows a plan view of a further touch panel provided by an embodiment of the present disclosure; FIG. 2a shows a plan view of still another touch panel provided by an embodiment of the present disclosure; and FIG. 2b shows a cross-sectional structural schematic diagram of the touch panel along a direction of B-B' in FIG. 2a.

For example, as shown in FIG. 1a and FIG. 1b, the touch panel comprises a substrate 100 and a tactile feedback layer 14, a touch detection circuit 10 and a plurality of driving electrodes 13 located on the substrate 100. The tactile feedback layer 14 is configured to adjust its hardness under control of the driving electrode 13, and the touch detection circuit 10 is configured to provide a plurality of touch detection points 16, each touch detection point 16 corresponding to at least one driving electrode 13.

For example, each touch detection point 16 can correspond to at least one driving electrode 13 adjacent thereto. When the touch detection point 16 is touched, the driving electrode 13 corresponding thereto can be applied with a driving signal to adjust the hardness of the tactile feedback layer 14, so that a user may feel hardness of an object at a position corresponding to the touch detection point 16.

For example, the hardness of the tactile feedback layer 14 changes with a temperature of the driving electrode 13, and the higher the temperature of the driving electrode 13, the higher the hardness of the tactile feedback layer 14. A touch feeling of the tactile feedback layer 14 at a normal temperature appears soft, and as the temperature of the driving electrode 13 increases, the touch feeling of the tactile feedback layer 14 gradually becomes hard. The tactile feedback layer 14 can provide corresponding tactile feedback according to hardness of a displayed object, so that the user can feels hardness of the displayed object he/she touches.

For example, variation of hardness of the tactile feedback layer 14 is repeatable, that is, when the temperature rises, a tactile sensation provided by the tactile feedback layer 14 becomes hard; and when the temperature falls, the tactile sensation provided by the tactile feedback layer 14 becomes soft again.

It should be noted that, in the embodiment of the present disclosure, "soft" and "hard" are relative concepts that represent property difference of objects. For example, in terms of a glass cup and a sponge, when the user touches the glass cup, the touch feeling appears hard; and when the user touches the sponge, the touch feeling appears soft.

For example, the tactile feedback layer 14 is provided on the driving electrode 13 and is in direct contact with the driving electrode 13, so that heat generated by the driving electrode 13 when there is a current flowing therethrough can be quickly and efficiently transferred to the tactile feedback layer 14, to adjust hardness of the tactile feedback layer 14.

For example, the tactile feedback layer 14 is made of a polymer hydrogel material. For example, the polymer hydrogel material is a temperature-sensitive polymer hydrogel. The temperature-sensitive polymer hydrogel can be classified into a high-temperature shrinkage type and a low-temperature shrinkage type. The temperature-sensitive polymer hydrogel contains a certain proportion of hydrophobic groups and hydrophilic groups. Temperature change may affect a hydrophobic effect of these groups and a hydrogen bonding interaction between macromolecular chains, so that the gel has its structure and volume changed. For example, an example of the temperature-sensitive polymer hydrogel includes, but is not limited to, a poly-N-isopropylacrylamide (PNIPAAm) hydrogel; a macromolecular chain of the PNIPAAm hydrogel has a hydrophilic amide group (—NHCO) and a hydrophobic isopropyl (—CH(CH3)2); the PNIPAAm has a low critical solution temperature (LCST) around 32° C.; when a temperature is higher than the LCST, the swelling PNIPAAm hydrogel shrinks; when a temperature is lower than the LCST, the PNIPAAm hydrogel re-swells; that is, at a low temperature, a polymer in the PNIPAAm hydrogel has a loose coil structure, and the touch feeling appears soft; and at a high temperature, a polymer in the PNIPAAm hydrogel transforms into a tight colloidal structure, and the touch feeling appears hard.

According to Joule's law, an amount of heat generated when a current flows through a conductor is proportional to a square of the current, is proportional to a resistance of the conductor, and is proportional to an energization time period. Therefore, a mathematical expression of Joule's law is as follows:

$$Q = I^2 R t$$

Where, Q represents the amount of heat generated by the conductor, I represents the current flowing through the conductor, R represents the resistance of the conductor, and t represents the time period. Therefore, the driving electrode 13 can be made of a conductive material with a relatively large resistance, so that the driving electrode 13 may generate a relatively large amount of heat even if a relatively small current is applied thereto, so as to adjust hardness of the tactile feedback layer 14, save power consumption, and reduce costs.

For example, the driving electrode 13 can be made of a material, including a metal conductive material such as a copper-based metal, an aluminum-based metal, and a nickel-based metal. The copper-based metal may be, for example, a metal alloy such as a copper-zinc alloy (CuZn), a copper-nickel alloy (CuNi), or a copper-zinc-nickel alloy (CuZnNi), and the nickel-based metal can be a metal alloy such as a nickel-chromium alloy and an aluminum-nickel-chromium alloy. The driving electrode 13 can also be made of a metal conductive material with a relatively low resistance, for example, a metal such as copper (Cu) or aluminum (Al). It should be noted that, the driving electrode 13 can also be made of a non-metal conductive material such as graphite, a carbon nanotube, or a transparent conductive material such as indium tin oxide (ITO), tin oxide (SnO) and indium gallium zinc oxide (IGZO).

For example, on the touch panel, all the driving electrodes 13 can be the same or different. "The same" may indicate that resistances, shapes, materials and the like of the driving electrodes 13 are all substantially the same, and "different"

may indicate that the resistances, shapes, materials and the like of the driving electrodes 13 are significantly different. For example, the resistances, shapes, and materials of all the driving electrodes 13 on the touch panel are the same, so that when a same current is applied to the driving electrodes 13 in an arbitrary region on the touch panel, amounts of heat generated thereby are the same, which facilitates overall control.

For example, in the embodiment of the present disclosure, various forms of touch detection circuits 10 can be used, as long as they are able to feed back a coordinate position when the touch panel is touched by the user; in addition, the touch detection circuit 10 can be a single-point touch detection circuit or a multi-point touch detection circuit. For example, the touch detection circuit 10 can include any one of a capacitive touch detection circuit, a photoelectric touch detection circuit, a resistive touch detection circuit, an infrared touch detection circuit, a surface acoustic wave touch detection circuit, and the like. Configurations of these touch detection circuits will not be described in detail in the present disclosure.

For example, the capacitive touch detection circuit can include a self-capacitive touch detection circuit and a mutual-capacitive touch detection circuit. The self-capacitive touch detection circuit includes a touch electrode array made of a transparent conductive material (e.g., ITO) on the substrate, and these touch electrodes respectively form capacitors with ground. When a finger touches the substrate, a capacitance of the finger is superimposed onto a corresponding touch electrode; a touch detection chip detects changes of capacitance values of respective touch electrodes during a touch period, so that a touch position can be determined. The mutual-capacitive touch detection circuit includes a horizontal electrode and a longitudinal electrode made of a transparent conductive material (e.g., ITO) on the substrate, and a capacitance is formed where two sets of electrodes intersect with each other. When the finger touches the substrate, coupling between two electrodes near a touch point is affected, so that a capacitance between the two electrodes changes. The touch detection chip detects a change in the capacitance between the two electrodes during the touch period, so as to determine the touch position.

For example, in one example, the touch detection circuit 10 is a mutual-capacitive touch detection circuit. Thus, the touch detection circuit 10 includes a first electrode layer and a second electrode layer sequentially stacked on the substrate 100 and insulated from each other. The first electrode layer includes a plurality of first electrode strips 11 provided at intervals, the second electrode layer includes a plurality of second electrode strips 12 provided at intervals, and the plurality of first electrode strips 11 and the plurality of second electrode strips 12 intersect with each other to form a plurality of intersection points. The first electrode strip 11 and the second electrode strip 12 form a mutual-capacitive touch structure, the first electrode strip 11 and the second electrode strip 12 may form a capacitance at the intersection point, and the touch position can be determined by detecting a change of a capacitance value at the intersection point, that is, the plurality of intersection points are the touch detection points 16.

It should be noted that, the first electrode strip 11 and the second electrode strip 12 may also form a self-capacitive touch structure, which will not be limited here.

For example, as shown in FIG. 1a, the plurality of first electrode strips 11 are arranged in parallel and extend in an X direction, and the plurality of second electrode strips 12 are arranged in parallel and extend in a Y direction. For example, in the embodiment of the present disclosure, the X direction is a row direction, the Y direction is a column direction, and the X direction and the Y direction intersect with each other at a certain angle, for example, perpendicular to each other. "Perpendicular" may refer to strictly perpendicular, or may also refer to approximately perpendicular.

For example, a plurality of touch detection points 16 are arranged on the substrate 100 in an array, and the driving electrodes 13 can also be arranged on the substrate 100 in an array, corresponding to the touch detection points 16 one by one; or a plurality of driving electrodes 13 correspond to one touch detection point 16; or one driving electrode 13 corresponds to a plurality of touch detection points 16.

For example, FIG. 1c shows a plane schematic diagram of one touch detection point 16 provided corresponding to four adjacent driving electrodes 13, when the driving electrodes 13 and the second electrode strips 12 are located in a same layer; FIG. 1d shows a plane schematic diagram of one touch detection point 16 provided corresponding to four adjacent driving electrodes 13, when the driving electrodes 13 and the second electrode strips 12 are located in different layers. As shown by rectangular dotted-line boxes 30 in FIG. 1c and FIG. 1d, one touch detection point 16 corresponds to four adjacent driving electrodes 13, that is, during a procedure of a touch operation, when one touch detection point 16 is detected to be touched, four driving electrodes 13 adjacent to the touch detection point 16 can be simultaneously driven to generate heat, so as to adjust hardness of the tactile feedback layer 14, so that a tactile feedback area formed on the tactile feedback layer can be larger than a touch area detected. It should be noted that, the number of driving electrodes 13 and an arrangement mode thereof are not limited to those shown in FIG. 1c and FIG. 1d, which will not be limited in the embodiments of the present disclosure.

For example, one of the first electrode strip 11 and the second electrode strip 12 is a touch sensing electrode, and the other is a touch driving electrode.

For example, the touch detection circuit 10 may further include a plurality of electrode lead-out wires, and the plurality of electrode lead-out wires can be electrically connected with the plurality of first electrode strips 11 and the plurality of second electrode strips 12 respectively for inputting/outputting signals; the plurality of electrode lead-out wires can be connected with the touch detection chip; the touch detection chip outputs/receives the signals through the electrode lead-out wires, and analyzes the received signals of the respective electrode strips, so as to implement touch detection and control. The touch detection chip can be provided separately, and can also be formed integrally with other computing devices, for example, the touch detection chip can be implemented with a dedicated computing device (e.g., a digital signal processor (DSP), etc.) or a general-purpose computing device (a central processing unit (CPU)), which is the same in embodiments below.

For example, as shown in FIG. 1b, a first insulating layer 15 can be provided between the first electrode layer and the second electrode layer, so as to achieve an insulation purpose. For example, examples of a material of the first insulating layer 15 include silicon nitride (SiNx), silicon oxide (SiOx), silicon oxynitride (SiNxOy), or other suitable materials.

For example, the first electrode strips 11 and/or the second electrode strips 12 can be made of a transparent conductive material, which may be, for example, a transparent metal oxide such as indium tin oxide (ITO) and indium zinc oxide (IZO). It should be noted that, the transparent conductive material is not limited to the several kinds as described above. Alternatively, the first electrode strips 11 and/or the second electrode strips 12 can also be made of an opaque conductive material. For example, the plurality of second electrode strips 12 are made of a transparent conductive material, while the plurality of first electrode strips 11 are made of metal wires. When the touch panel is used in a display apparatus, the plurality of first electrode strips 11 can be made of any material as long as it does not affect a normal display effect; while when the touch panel is used in a non-display apparatus, the material of the plurality of first electrode strips 11 is not limited.

It should be noted that, the number of the plurality of first electrode strips 11 and the plurality of second electrode strips 12 and distances therebetween can be changed according to actual situations, such as an optical property of the transparent conductive material used, a size of the touch panel, accuracy and an aperture ratio. For example, when transparency of the transparent conductive material used is relatively low, and the required accuracy (e.g., touch accuracy) is relatively low, in order to increase the aperture ratio, the number of the plurality of first electrode strips 11 and the second electrode strips 12 can be reduced, and the intervals therebetween can be increased. Conversely, when the transparency of the transparent conductive material used is relatively high and the required accuracy is relatively high, the number of the first electrode strips 11 and the second electrode strips 12 can be increased and the intervals therebetween reduced.

For example, as shown in FIG. 1a and FIG. 1b, in one example, the driving electrode 13 is located between two adjacent touch detection points 16. For example, the driving electrode 13 and the second electrode strip 12 are provided in a same layer, and the driving electrode 13 is provided at a gap between two adjacent second electrode strips 12 in the second electrode layer, which, thus, may reduce a thickness of the touch panel.

For example, the tactile feedback layer 14 is provided on the second electrode layer and covers all the driving electrodes 13 and the second electrode strips 12. A side of the second electrode layer away from the first electrode layer is a touch side, and the tactile feedback layer 14 covers the side of the second electrode layer away from the first electrode layer; that is, as compared with the first electrode layer and the second electrode layer, the tactile feedback layer 14 is closer to a touch surface of the touch panel, so that a layer structure between the tactile feedback layer 14 and the touch surface of the touch panel can be reduced, which may improve a tactile feedback effect, and enhance a tactile experience.

For example, in another example, the second electrode layer can be covered with a second insulating layer (not shown); the driving electrodes 13 are arranged on the second insulating layer in an array, and an orthogonal projection of the driving electrode 13 on the substrate 100 is located between orthogonal projections of two adjacent touch detection points 16 on the substrate 100. As shown in FIG. 1d, in the X direction and the Y direction, the driving electrode 13 can be provided between every two adjacent touch detection points 16; that is, in a direction perpendicular to the substrate 100, there can be overlapping portions between some driving electrodes 13 and the second electrode strips 12, so that the number of the driving electrodes 13 can be increased, and the tactile feedback accuracy improved.

For example, the touch panel can have a driving signal line separately provided for the driving electrode 13. As shown in FIG. 1a, in one example, the touch panel further comprises a plurality of first driving lines 21 and a plurality of second driving lines 22, insulated from and intersecting with each other, the plurality of first driving lines 21 extend along an extension direction of the first electrode strip 11, the plurality of second driving lines 22 extend along an extension direction of the second electrode strip 12, the plurality of first driving lines 21 are insulated from the first electrode strip 11 and the second electrode strip 12, and the plurality of second driving lines 22 are also insulated from the first electrode strip 11 and the second electrode strip 12. Each driving electrode 13 is respectively connected with one first driving line 21 and one second driving line 22 by overlap joint, via hole, and the like.

For example, the first driving line 21 and the second driving line 22 are used for providing the driving electrode 13 with a driving signal. The first driving line 21 is connected with a high electrical level, and the second driving line 22 is connected with a low electrical level. As shown in FIG. 1a, the first driving line 21 and the second driving line 22 respectively provide a high electrical level and a low electrical level for a first end F and a second end S of the driving electrode 13, that is, a voltage of the first end F is greater than a voltage of the second end S, so that a current can flow through the driving electrode 13 to enable the driving electrode 13 to generate heat, and to further control the tactile feedback layer 14 to adjust its hardness. The first driving line 21 can also be connected with a low electrical level, and accordingly, the second driving line 22 is connected with a high electrical level, as long as there is a voltage difference between the first end F and the second end S of the driving electrode 13, so that the current can flow through the driving electrode 13, which will not be limited here.

It should be noted that, a resistance between the first end F and the second end S of the driving electrode 13 can be set relative large, so as to increase an amount of heat generated by the driving electrode 13. A resistance formula is as shown below:

$$R=\rho \cdot L/S$$

Where, R is a resistance of the material, $\rho$ is resistivity of the material, L is a length of the material, and S is a cross-sectional area of the material. Thus, the driving signal can be applied to both ends of the driving electrode 13 in a length direction, so that in a current path formed by the first driving line 21, the driving electrode 13 and the second driving line 22, the resistance of the driving electrode 13 is relatively large, and the driving electrode 13 is able to generate a larger amount of heat even if a relatively small current is applied thereto, so as to adjust hardness of the tactile feedback layer 14 and save power consumption.

For example, in another example, the driving electrode 13 can further adopt the first electrode strip 11 and the second electrode strip 12 as driving signal lines by time division multiplexing, to reduce separately added driving lines in rows and columns, and reduce production costs. As shown in FIG. 2a and FIG. 2b, each driving electrode 13 can be connected with one first electrode strip 11 and one second electrode strip 12. A square resistance of the driving electrode 13 needs to be larger than a square resistance of the first electrode strip 11 and the second electrode strip 12, to ensure that a region of the tactile feedback layer 14 corresponding to the driving electrode 13 becomes hard, while hardness in a region of the tactile feedback layer 14 corresponding to the first electrode strip 11 and the second electrode strip 12 has almost no change, so as to ensure a tactile effect.

For example, as shown in FIG. 2a and FIG. 2b, the first insulating layer 15 can include a plurality of via holes 23 therein. The plurality of via holes 23 all pass through the first insulating layer 15 to expose a portion of the first electrode strip 11. The driving electrode 13 and the second electrode strip 12 are provided in a same layer, the first end F of the driving electrode 13 is connected with the first electrode strip 11 through the via hole 23, and the second end S of the driving electrode 13 is connected with the second electrode strip 12 through a lead 24.

For example, the first electrode strip 11 is connected with a high electrical level, and the second electrode strip 12 is connected with a low electrical level, so as to provide the driving electrode 13 with the driving signal. For example, the first electrode strip 11 can be connected with a positive electrode of a power supply; the second electrode strip 12 can be connected with a negative electrode of the power supply. The power supply can include a voltage source or a current source. It should be noted that, a signal adjusting circuit can be provided between the positive electrode of the power supply and the first electrode strip 11, to adjust magnitudes of a voltage or a current signal transmitted from the first electrode strip 11 to the driving electrode 13, so as to provide different driving electrodes 13 with different driving signals. The first electrode strip 11 can also be connected with a low electrical level, and accordingly, the second electrode strip 12 is connected with a high electrical level, which will not be limited here.

For example, the touch panel provided by the embodiment of the present disclosure may further implement fingerprint detection with the capacitive touch detection circuit. During fingerprint detection, the driving signal of the driving electrode 13 is in an OFF state, and the driving electrode 13 can increase a signal volume of a mutual capacitance, so that fingerprint detection is easier, and accuracy and sensitivity of fingerprint detection are improved.

For example, as shown in FIG. 1b, the touch panel can further include a protective layer 17. The protective layer 17 covers the tactile feedback layer 14, to protect the tactile feedback layer 14 from external influence.

For example, the protective layer 17 can be made of an elastic material, so that the user may better feel hardness of the tactile feedback layer 14, and enhance the tactile experience. Examples of the elastic material can include polyurethane foam, synthetic rubber or natural rubber, and the like.

For example, the substrate 100 can be a transparent insulating substrate, and an example of the substrate 100 can be a glass substrate, a quartz substrate, a plastic substrate, a ceramic substrate, a silicone substrate, or other suitable substrates. The substrate 100 can also be a substrate on which a functional component is formed, for example, a substrate multiplexed with other devices, for example, a color filter substrate in a liquid crystal display panel, a package substrate in an organic light-emitting diode (OLED) display panel, and the like.

For example, the touch panel provided by the embodiment of the present disclosure can be a rectangular touch panel, a circular touch panel, an oval touch panel or a polygonal touch panel, and the like. In addition, the touch panel can be not only a flat touch panel, but also a curved touch panel, or even a spherical surface touch panel.

Figure 3:
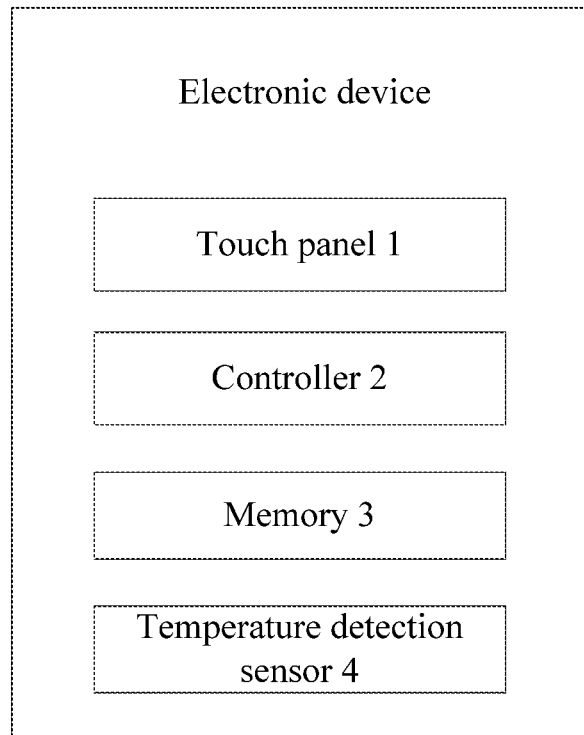
FIG. 3 is a schematic block diagram of an electronic device provided by an embodiment of the present disclosure.

An embodiment of the present disclosure further provides an electronic device. FIG. 3 is a schematic block diagram of the electronic device provided by the embodiment of the present disclosure.

For example, as shown in FIG. 3, the electronic device includes the touch panel 1 according to any one embodiment of the present disclosure and a controller 2. The touch panel 1 is configured to accept touch information and feed back tactile information. For example, a touch detection circuit is configured for detecting the touch information, and a driving electrode and a tactile feedback layer are configured for feeding back the tactile information. The controller 2 is configured to send a control signal to the touch panel 1 according to the touch information, to control the touch panel 1 to enable a tactile feedback function. The electronic device can simulate a tactile sensation of a real object with the tactile feedback layer, control hardness of the tactile feedback layer through the driving electrode, implement tactile feedback with fingerprint identification accuracy, enhance a tactile feedback experience and reduce power consumption.

For example, the controller 2 is further configured to set a tactile feedback level of a predetermined position of the touch panel 1. For example, the predetermined position can be preset according to a fixed background image or a reference scenario, and for example, it is fixed during an operation procedure. For another example, when the electronic device further includes a display function and the touch panel 1 is operated in conjunction with the display function, a displayed image can be fixed or change with time, and the controller 2 can analyze information in the displayed image, for example, different objects, match a tactile feedback level according to hardness and a display position of the object in the image, and then set the tactile feedback level at a corresponding position of the object on the touch panel 1, so as to adjust hardness of the tactile feedback layer at the corresponding position according to the tactile feedback level.

For example, as shown in FIG. 3, the electronic device further includes a memory 3. The memory 3 can be configured for storing the tactile feedback level; the memory 3 can also store data such as touch position information, a preset upper temperature limit and a preset lower temperature limit of the tactile feedback level, and can also store operation instructions used in the controller 2, and the like.

For example, the tactile feedback levels can be divided according to hardness of the object. For example, the tactile feedback levels can include soft, semi-soft, semi-hard, hard, and the like. It should be noted that, the tactile feedback level is related to a state formed by hardness of the tactile feedback layer with changes of temperature; if, with changes of temperature, hardness of the tactile feedback layer has four states of soft, semi-soft, semi-hard and hard, then, four tactile feedback levels of soft, semi-soft, semi-hard and hard can be set. The above-described division of the tactile feedback level is illustrative, and the tactile feedback level is not limited to division into the four levels of soft, semi-soft, semi-hard and hard, and the tactile feedback level can be further subdivided, which will not be limited here.

For example, the controller 2 can be a single-chip microcomputer, a programmable logic controller (PLC) or a central processing unit (CPU), and the like, for example, the CPU can be an X86 or an ARM, and the like.

For example, the memory 3 can be various types of memory devices, for example, a volatile memory device or a nonvolatile memory device, a magnetic memory device or a semiconductor memory device, and the like; more specifically, the memory 3 can include a memory card of a mobile phone, a memory unit of a tablet personal computer, a hard disk of a personal computer, magnetic disk, optical disk, random access memory (RAM), read only memory (ROM), erasable programmable read only memory (EPROM), static random access memory (SRAM), portable compact disk read-only memory (CD-ROM), USB memory, or any combination of the above-described storage media.

For example, as shown in FIG. 3, in one example, the electronic device can further include a temperature detection sensor 4. The temperature detection sensor 4 is configured to detect a temperature of the driving electrode; when the temperature of the driving electrode is higher than the preset upper temperature limit of the corresponding tactile feedback level, the controller 2 transmits an OFF signal to turn off the driving signal for controlling the driving electrode; and when the temperature of the driving electrode is lower than the preset lower temperature limit of the corresponding tactile feedback level, the controller 2 transmits an ON signal to turn on the driving signal for controlling the driving electrode.

For example, different tactile feedback levels correspond to different preset upper temperature limits and preset lower temperature limits.

For example, the temperature detection sensor 4 can include a contact temperature sensor and a non-contact temperature sensor. The contact temperature sensor can include, for example, a thermistor, a ceramic thermal resistor, or an ultra-low temperature thermal resistor, and the like; and the non-contact temperature sensor can be an infrared temperature sensor, and the like.

It should be noted that, since an amount of heat generated by the driving electrode is proportional to a time period, the electronic device can further control the time period of the driving signal applied to the driving electrode, so as to control the amount of heat generated by the driving electrode. For example, the electronic device can be provided with a timer, to detect the time period of the driving signal applied to the driving electrode, and then control the turning ON and OFF of the driving signal through the controller 2.

For example, in one example, the electronic device can further include a display panel. The display panel is configured to overlap with the touch panel 1 and display an image. For example, the touch panel 1 can be provided on a display side of the display panel; in this case, the touch panel 1 and the display panel can be separately fabricated and then assembled together, or the touch panel 1 may share some components with the display panel, and the touch panel 1 can be partially or entirely formed on a display-side substrate of the display panel. For example, a substrate of the touch panel 1 can be the display-side substrate of the display panel. Alternatively, in another example, the touch panel 1 is configured to display an image, the touch panel can be integrally formed with the display panel, and the touch panel is formed in the display panel in an embedded manner, for example.

For example, the touch panel 1 is configured to adjust hardness of the tactile feedback layer at a corresponding position according to an object in a displayed image, so as to implement a tactile feedback function.

For example, the display panel can include a liquid crystal display panel, an organic light-emitting diode display panel, a flexible display panel, a three-dimensional display panel, and the like.

For example, the electronic device can be a television, a digital camera, a mobile phone, a watch, a tablet personal computer, a laptop, a navigator, and any other product or component having a touch control function.

Figure 4:
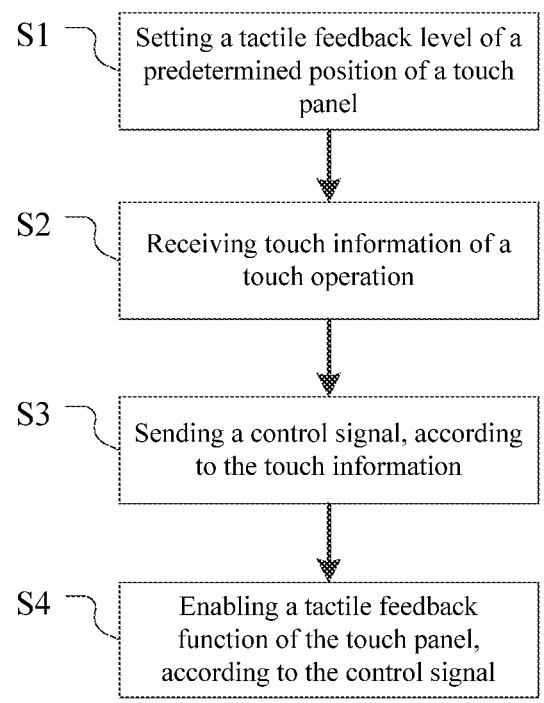
FIG. 4 is a schematic flow chart of a driving method of an electronic device provided by an embodiment of the present disclosure.

An embodiment of the present disclosure provides a driving method of any one of the electronic devices as described above. FIG. 4 shows a schematic flow chart of the driving method provided by the embodiment of the present disclosure.

For example, as shown in FIG. 4, the driving method can comprise steps of:

Step S1: setting a tactile feedback level of a predetermined position of a touch panel;

Step S2: receiving touch information of a touch operation;

Step S3: sending a control signal, according to the touch information; and

Step S4: enabling a tactile feedback function of the touch panel, according to the control signal.

A driving procedure of the driving method provided by the embodiment of the present disclosure mainly includes: firstly, the tactile feedback level of the predetermined position of the touch panel is set; then, after the touch panel detects the touch operation, the touch panel receives the touch information and transmits position information of the touch operation to the controller; next, the controller transmits the control signal according to the position information, and enables the tactile feedback function of the touch panel, and the controller is further configured for controlling a power supply to apply a driving signal to a driving electrode corresponding to the touch position, so as to adjust hardness of the tactile feedback layer corresponding to the touch position, and implement tactile feedback.

For example, in the electronic device, a first driving line and a second driving line can be separately provided to apply the driving signal to the driving electrode; or, a first electrode strip and a second electrode strip can also be multiplexed in a time-sharing manner to apply the driving signal to the driving electrode.

For example, in step S1, a tactile feedback level of one or more images can be preset; or, a tactile feedback level of a corresponding position can also be set according to an object in a displayed image, so as to adjust hardness of the tactile feedback layer in different positions in real time according to the tactile feedback level.

For example, in one example of the embodiment of the present disclosure, step S1 can include: acquiring hardness of an object in an image used in conjunction with the touch panel, matching a tactile feedback level according to hardness of the object in the image; and setting the tactile feedback level at the corresponding position of the object in the image. For example, the controller receives the image displayed on the touch panel and analyzes it, recognizes the object in the displayed image by using an image recognition technology, finds out hardness corresponding to the object in a database according to the recognized object; then matches the tactile feedback level according to hardness of the object, and corresponds the matched tactile feedback level to the position of the object on the touch panel, so as to complete the setting of the tactile feedback level. The image used in conjunction with the touch panel includes a fixed background image or a displayed image. Hardness of the object in the image can be acquired by analyzing these images. For example, the setting of the tactile feedback level can be performed with a preset lookup table including material types and corresponding hardness levels of these materials.

For example, in the example, the driving method further includes: re-analyzing hardness of the object in the image, after the image is updated, and updating the tactile feedback level at the corresponding position of the object in the image. Therefore, the electronic device can set the tactile feedback level in real time according to the displayed image, so as to implement tactile feedback of different displayed objects.

For example, an image recognition operation can include procedures such as image input, pre-processing, feature extraction, classification and matching. The pre-processing, for example, includes operations such as image segmentation, image enhancement, and gray-scale binarization, which can be implemented by hardware or software.

For example, the above-described driving method can further include: setting a preset upper temperature limit and a preset lower temperature limit of the tactile feedback level, turning off the driving signal for controlling the driving electrode when a temperature of the driving electrode is higher than the preset upper temperature limit of the tactile feedback level; and turning on the driving signal for controlling the driving electrode when the temperature of the driving electrode is lower than the preset lower temperature limit of the tactile feedback level. For example, the temperature of the driving electrode is monitored in real time by a temperature detection sensor, and the controller turns on or turns off the driving signal according to a monitoring result, so as to prevent the temperature from being too high and causing a deviation or even an error occurring to tactile feedback, and to improve a tactile experience effect.

For example, the above-described driving method can further include: disenabling tactile feedback, when the touch operation ends. A user may choose to enable or disenable tactile feedback according to actual needs. When a tactile feedback operation is performed, the tactile feedback function of the touch panel is enabled; and when a normal touch operation, for example, text editing, is performed, the tactile feedback function of the touch panel is disenabled.

For example, in a specific example, the image displayed on the touch panel includes two objects, of which one is a glass cup, the other is a sponge, the glass cup corresponds to a first region of the touch panel, and the sponge corresponds to a second region of the touch panel. A touch feeling of the glass cup appears hard, and a touch feeling of the sponge appears soft, so that a hard tactile feedback level of the first region is set, and a soft tactile feedback level of the second region is set; that is, a current signal applied to a driving electrode in the first region is larger than a current signal applied to a driving electrode in the second region. For example, when the user touches the first region, a power supply applies a larger current signal to drive the driving electrode in the first region to generate heat, so that a tactile feedback layer in the first region is relatively hard, and the user may feel that a tactile sensation of the glass cup in the displayed image is hard; when the user touches the second region, the power supply applies a smaller current signal to drive the driving electrode in the second region to generate heat, so that the tactile feedback layer in the second region is relatively soft, and the user may feel that a tactile sensation of the sponge in the displayed image is soft. For example, a preset upper temperature limit corresponding to the tactile feedback level set in the first region is T11, and a preset lower temperature limit is T12. If the user continues touching the first region, the power supply continues applying the current signal to the driving electrode in the first region; when a temperature of the driving electrode in the first region exceeds T11, the current signal is turned off, and when the temperature of the driving electrode in the first region is lower than T12, the current signal is turned on again, so that the temperature of the driving electrode in the first region is maintained between T12 and T11, and thus, the user may feel the tactile sensation of the glass cup, which prevents the tactile feedback layer from appearing too hard or too soft, improves a tactile feedback effect, and enhances the user's tactile experience.

With respect to the present disclosure, several points below need to be explained:

(1) The drawings of the embodiments of the present disclosure relate only to the structures involved in the embodiments of the present disclosure, and normal designs can be referred to for other structures.

(2) In case of no conflict, the embodiments of the present disclosure and the features in the embodiments can be combined with each other to obtain a new embodiment.

The above are only specific embodiments of the present disclosure, but the scope of the embodiment of the present disclosure is not limited thereto, and the scope of the present disclosure should be the scope of the following claims.

The invention claimed is:

1. A touch panel, comprising: a substrate and a tactile feedback layer, a touch detection circuit and a plurality of driving electrodes located on the substrate, wherein, the tactile feedback layer is configured to adjust hardness thereof under control of the driving electrode, the touch detection circuit is configured to provide a plurality of touch detection points, each of the touch detection points corresponding to at least one of the driving electrodes, the touch detection circuit includes a first electrode layer and a second electrode layer sequentially stacked on the substrate and insulated from each other, the first electrode layer includes a plurality of first electrode strips provided at intervals, the second electrode layer includes a plurality of second electrode strips provided at intervals, the plurality of first electrode strips and the plurality of second electrode strips intersect with each other to obtain a plurality of intersection points, and the plurality of intersection points are the touch detection points, the touch panel further comprises: a plurality of first driving lines and a plurality of second driving lines insulated from each other, the plurality of first driving lines extend along an extension direction of the first electrode strip, the plurality of second driving lines extend along an extension direction of the second electrode strip, and each of the driving electrodes is connected with one of the first driving lines and one of the second driving lines, the first driving lines and the second driving lines respectively provide a high electrical level and a low electrical level for a first end and a second end of the driving electrodes, so that a current flows through the driving electrodes.

2. The touch panel according to claim 1, wherein, a square resistance of the driving electrode is larger than that of the first electrode strip and the second electrode strip, and each of the driving electrodes is connected with one of the first electrode strips and one of the second electrode strips.

3. An electronic device, comprising: the touch panel according to claim 1, and a controller, wherein, the touch panel is configured to receive touch information and feed back tactile information, the controller is configured to send a control signal to the touch panel according to the touch information, to control the touch panel enabling a tactile feedback function.

4. The electronic device according to claim 3, further comprising: a memory, wherein, the controller is further configured to set a tactile feedback level of a predetermined position of the touch panel;

the memory is configured to store the tactile feedback level.

5. The electronic device according to claim 4, further comprising: a temperature detection sensor, configured to detect a temperature of the driving electrode,
when the temperature of the driving electrode is higher than a preset upper temperature limit of the tactile feedback level, the controller is further configured to turn off the driving signal of the driving electrode;
when the temperature of the driving electrode is lower than a preset lower temperature limit of the tactile feedback level, the controller is further configured to turn on the driving signal of the driving electrode.

6. The electronic device according to claim 3, further comprising: a display panel, configured to overlap with the touch panel and display an image; or
the touch panel is further configured to display an image;
wherein, the touch panel is configured to adjust hardness thereof at a corresponding position according to an object in the displayed image.

7. A driving method used in the electronic device according to claim 3, comprising:
setting a tactile feedback level of a predetermined position of a touch panel;
receiving touch information of a touch operation;
sending a control signal, according to the touch information; and
enabling a tactile feedback function of the touch panel, according to the control signal.

8. The driving method according to claim 7, wherein, the setting a tactile feedback level of a predetermined position of a touch panel, includes:
acquiring hardness of an object in an image used in conjunction with the touch panel,
matching the tactile feedback level according to the hardness of the object in the image;
setting the tactile feedback level at the corresponding position of the object in the image.

9. The driving method according to claim 8, further comprising:
re-analyzing the hardness of the object in the image, after the image is updated;
updating the tactile feedback level at the corresponding position of the object in the image.

10. The driving method according to claim 7, further comprising:
turning off the driving signal of the driving electrode when a temperature of the driving electrode is higher than a preset upper temperature limit of the tactile feedback level;
turning on the driving signal of the driving electrode when the temperature of the driving electrode is lower than a preset lower temperature limit of the tactile feedback level.

11. A touch panel, comprising: a substrate and a tactile feedback layer, a touch detection circuit and a plurality of driving electrodes located on the substrate,
wherein, the tactile feedback layer is configured to adjust hardness thereof under control of the driving electrode,
the touch detection circuit is configured to provide a plurality of touch detection points, each of the touch detection points corresponding to at least one of the driving electrodes,
the touch detection circuit includes a first electrode layer and a second electrode layer sequentially stacked on the substrate and insulated from each other,
the first electrode layer includes a plurality of first electrode strips provided at intervals, the second electrode layer includes a plurality of second electrode strips provided at intervals, the plurality of first electrode strips and the plurality of second electrode strips intersect with each other to obtain a plurality of intersection points, and the plurality of intersection points are the touch detection points,
each of the driving electrodes is connected with one of the first electrode strip and one of the second electrode strips, the first electrode strips and the second electrode strips respectively provide a high electrical level and a low electrical level for a first end and a second end of the driving electrodes, so that a current flows through the driving electrodes.

\* \* \* \* \*